United States Patent [19]

Giuffre et al.

[11] 4,314,601
[45] Feb. 9, 1982

[54] HEAT EXCHANGE SYSTEM FOR RECYCLING WASTE HEAT

[76] Inventors: Anthony A. Giuffre; Anthony F. Giuffre, both of 4344 N. 70th St., Milwaukee, Wis. 53216

[21] Appl. No.: 948,392

[22] Filed: Oct. 4, 1978

[51] Int. Cl.³ .............................................. F28D 15/00
[52] U.S. Cl. .............................. 165/1; 165/DIG. 12; 165/35; 165/40; 126/299 R; 237/67; 165/104.21
[58] Field of Search .................... 165/105, DIG. 12, 1, 165/35, 40; 237/67, 8 R; 126/299 R

[56] References Cited

U.S. PATENT DOCUMENTS

| | | | |
|---|---|---|---|
| 904,499 | 11/1908 | Ammon | 237/67 X |
| 1,619,660 | 3/1927 | Field | 165/105 X |
| 1,765,038 | 6/1930 | Wait | 165/105 |
| 2,083,611 | 6/1937 | Marshall | 165/105 X |
| 2,522,373 | 9/1950 | Jodell | 237/67 X |
| 2,779,714 | 1/1957 | Keith | 165/105 X |
| 3,194,308 | 7/1965 | Haried | 165/DIG. 12 |
| 3,645,329 | 2/1972 | Treherne et al. | 165/105 |
| 3,749,158 | 7/1973 | Szabo et al. | 165/DIG. 12 |
| 4,084,745 | 4/1978 | Jones | 126/299 X |
| 4,216,903 | 8/1980 | Giuffre | 165/105 X |

FOREIGN PATENT DOCUMENTS

521103 2/1921 France .................. 237/67

*Primary Examiner*—Albert W. Davis
*Attorney, Agent, or Firm*—McWilliams, Mann & Zummer

[57] ABSTRACT

A heat exchange system for recycling waste heat, such as that leaving a building stack or flue, to supply heat where needed, such as to incoming fresh air or to tempered stored water of the building water storage system, wherein the building has a source of heat at a constant temperature (such as a furnace, a cooking facility, or a washing facility), from which waste heat is involved in the materials to be conveyed therefrom for discharge from the building, in which a closed circuit heat generated refrigerant flow type refrigeration system is established including a heat recovery coil in heat exchange relation to the waste heat, a heat discharge coil in heat transfer relation to the fluid to be heated at a level above that of the heat recovery coil, and a refrigerant receiver at a level adjacent the level of the heat recovery coil, with the system being charged with a halogenated hydrocarbon type refrigerant to bring the liquid level of the charge within the receiver above the level of the heat recovery coil and below the level of the heat discharge coil. The heat transferred to the refrigerant at the heat recovery coil is utilized as the sole means for freely cycling the refrigerant through the system heat pump fashion, with a liquid phase portion of the refrigerant being continuously recirculated between the receiver and the heat recovery coil, and heat charged vaporized refrigerant being supplied from the receiver to the heat discharge coil and returned in heat depleted liquid phase form to the receiver.

13 Claims, 10 Drawing Figures

HEAT EXCHANGE SYSTEM FOR RECYCLING WASTE HEAT

This application discloses improvements in the heat exchange system disclosed in Anthony A. Guiffre U.S. Pat. No. 4,216,903 granted Aug. 12, 1980.

This invention relates to providing for recycling some of the waste heat, such as that passing out of a building stack or flue, to make use of such heat, such as, for instance, for the purpose of heating incoming air or tempering stored water of the building water system, and more particularly, to a refrigeration arrangement of the heat generated refrigerant flow type which achieves that end.

The present high cost of energy sources to produce heat have made it important to minimize wasting heat in the broad sense. More specifically, facilities that require more or less continuous supply of heat to perform their functions are now requiring, from a practical standpoint, incorporation of ways and means to harness heat that might otherwise be discharged into the atmosphere or sewer system along with the waste materials involved, to perform useful heating functions.

For instance, buildings housing restaurant facilities and the like customarily are equipped to provide for forced air ventilation of the cooking facilities through a stack or other suitable discharge duct, with fresh air being drawn into the building through suitable ducting for ventilating and air replacement purposes. In many instances, and especially in the short order field, the cooking facilities, such as griddles and the like, are in intensive use for long periods of time each working day. As is common knowledge, the discharge from the building stack or flue contains much waste heat which is therefore lost to the atmosphere. The operation of furnaces for building heating and/or general purpose use presents similar waste heat problems as furnace products of combustion are discharged through stacks or flues to the atmosphere.

The same type of heat loss problem is obviously involved in connection with the discharging of the water charges of washing machines and the like into sewer drains after washing procedures have been completed.

On the other hand, many commercial facilities require the bringing into the building of fresh air as part of the ventilating system involved, and when the fresh air is brought into the building when outside ambient temperatures are well below room temperature, heating of the incoming air is usually desirable. The cost of supplying the requisite heat for incoming air has become a very significant item of expense, especially in the case of buildings housing restaurant facilities and the like where forced air ventilation in northern climates is required.

Commercial and residential facilities commonly have a hot water system built into same for supplying hot water for general purpose use, with the water system being supplied with water from municipal mains or the like; of course, this water must be heated to provide the desired hot water. Hot water heaters are commonly employed for this purpose with the requisite heat usually being supplied using natural gas fuel or electrical energy type heating systems that both involve considerable attendant expense that can be alleviated or reduced by preheating or tempering of main water before it is taken into the water heater.

A principal object of the present invention is to provide for simple but effective means and methods for recycling some of the waste heat that would otherwise be lost by discharge of waste gases from flues or stacks, or waste liquids into sewer systems, and utilizing same for useful purposes, such as to heat incoming fresh air where outside ambient temperatures require this, or tempering stored water of a hot water system.

Another principal object of this invention is to provide a closed circuit heat generated refrigerant flow refrigerant system for recycling waste heat, for such commonly needed purposes of heating incoming fresh air or tempering the stored water of the hot water system, in which the refrigeration system is free of pumps or compressors, and is arranged to provide for rapid recycling of the refrigerant to the system for maximized efficiency.

A more general object of the invention is to provide a refrigerant type heat transfer system of the heat generated refrigerant flow type that is appliable to transfer heat from any heat source to a heat sink at a temperature that is lower than the heat source.

A more specific object of the invention is to provide a system for continuous recycling of waste heat having thermostatically operated controls for switching the supply of the waste heat between different objectives, such as, for instance, providing for supply of the recycled heat to incoming fresh air where outside ambient temperatures are below predetermined level, and alternately supplying the recycled heat to a water tempering tank when the outside ambient temperature is above said predetermined level, or for merely temporarily discontinuing the supply of the waste heat for temperature control or other purposes.

Other objects are to provide a waste heat recycling system that is of few and simple parts, that is economical to install and operate, and that is long lived and reliable in use.

In accordance with an illustrated embodiment of the invention, which is disclosed for illustrative purposes as applied to a restaurant facility of the type indicated, a closed circuit heat generated refrigerant flow type refrigeration system is established in operative association with the building stack, the building fresh air intake duct, and the building hot water system storage tank whereby an evaporator in the form of a heat recovery coil is mounted in the stack and in heat exchanger relation with the waste heat bearing gases passing through the stack and condensers in the form of heat transfer coils are mounted in heat transfer relation to the incoming fresh air and the water of the storage tank. The heat transfer coils are disposed at levels above the horizontal level of the heat recovery coil. The refrigeration system includes a refrigerant receiver that provides a chamber located adjacent to the level of the heat recovery coil in which the vapor phase of the refrigerant is separated from its liquid phase to define a refrigerant liquid level in the chamber that is above the level of the heat recovery coil and below the level of the heat transfer coils.

The refrigerant outflow conduiting communicates between the upper side of the receiver and the respective heat transfer coils for exposing heat charged refrigerant from the receiver to the respective heat transfer coils, and return conduiting communicating between the respective heat discharge coils and the lower side of the receiver is provided for returning under gravity heat depleted liquid refrigerant from the level of the respective heat transfer coils.

An important feature of the present invention is that the refrigerant system receiver and the heat recovery coil are connected by recycle conduiting for supplying the heat depleted refrigerant liquid to the heat recovery coil and returning all of the refrigerant passing through the heat recovery coil to the receiver, including both liquid and gaseous phase refrigerant, to establish a liquid refrigerant recirculation between the heat recovery coil and the receiver that provides for improved heat transfer characteristics at the heat recovery coil and eliminates hot spots and superheating of the vapor within the heat recovery coil.

The conduiting that communicates the refrigerant from the respective heat transfer coils for return to the receiver is formed adjacent the level of the receiver to define a liquid refrigerant trap of the gravity induced type, which, however, is free of any obstructions to free flow of the liquid refrigerant through the conduiting involved for return to the receiver. The trap is arranged so that gravity acting on the liquid refrigerant overcomes the pressure differential between the receiver and the heat transfer coils for liquid flow of the refrigerant back into the receiver.

The system is fully charged with a halogenated hydro-carbon type refrigerant to establish the liquid level of the refrigerant within the receiver whereby the heat recovery coil is fully flooded with refrigerant.

Operatively associated with the exemplary heat recycling system as described above are thermostatically operated control valves that are arranged for alternate isolation of the respective heat transfer coils from the heat recovery coil, in accordance with the predetermined ambient air temperature exteriorily of the building, whereby the heat recovered from the stack is supplied to the incoming fresh air when the exterior ambient temperature is below the selected level, and when the exterior ambient temperature is above the selected level, the recovered stacked heat is applied to water to be tempered.

The heat supplied to the refrigerant system at the heat recovery coil is utilized in conjunction with gravity return of the heat depelted liquid refrigerant from the heat transfer coils, as the sole means to freely cycle the refrigerant through the system free of mechanical pumping action on the refrigerant. The application of heat to the heat recovery coil not only vaporizes liquid refrigerant in the heat recovery coil, but starts a recycling flow of the liquid refrigerant between the heat recovery coil and the receiver that has the effect of inducing a rapid refrigerant flow through the heat recovery coil which eliminates hot spot and vapor superheating problems and speeds up heat transfer characteristics.

At the receiver, the lighter vaporized refrigerant rises above the level of the liquid refrigerant and due to the pressure build up of the vaporized refrigerant in the system, flows through the outflow conduiting to the locale of the respective heat transfer coils for communication therewith, as controlled by the control valves where present. The refrigerant liquifies on giving up its heat at the heat transfer coils and returns under gravity through the return conduiting, the liquid refrigerant trap, and to the lower side of the receiver.

As long as stack heat is available for application to the heat recovery coil, the refrigerant system will remain in operation under the control of the indicated control valves, with the refrigerant continuously recycling through the system under the heat generated refrigerant outflow and gravity induced return employed in practicing the invention.

Alternatively, the heat transfer systems employed may be simplified to eliminate the indicated control valves and supply the stack heat only for one purpose use, such as for heating the incoming fresh air, or for heating water to be tempered, or heating a basement area, or any general purpose use where heat is to be transferred from a heat source to a heat sink that is at a temperature lower than that of the source.

Also, a modified theremostatically operated control valve arrangement may be employed to redirect the refrigerant flow in such a manner that the supply of liquid refrigerant to the heat recovery coil is cut off without having to shut down the sourse of heat.

A special feature of the invention is that the heat transferred to the heat recovery coil and the heat transferred at the heat transfer coil are what motivate the cycling of the refrigerant through the system and provide a refrigeration system type heat transfer action between the heat recovery coil and the respective heat transfer coils involved that is free of mechanical pumping requirements. The liquid traps that are in the return conduiting of the system in addition to providing for overcoming of the pressure differential between the receiver and the heat transfer coils resist reverse flow of the refrigerant so that there is a smooth and continuous run-around type movement of the refrigerant through the coils, conduiting, and receiver, that are involved in the refrigeration system, with refrigerant return flow from the system condenser or condensers being under gravity.

It is an important feature of the invention that, as temperature differentials between the heat source at the heat recovery coil forming the system evaporator (which heat source is preferably of constant temperature for any given application), and the heat discharge point or points of the system (the condenser or condensers forming the heat sink) are increased, recycling of the refrigerant through the refrigeration system accelerates without the need for any mechanical pumping action on the refrigerant being required. This accelerating effect reaches a maximum that will depend on the refrigerant employed in the system, the heat input at the heat recovery coil, the size of the piping employed to provide the conduiting required, and the refrigerant employed in the system.

Other objects, uses, and advantages will be obvious or become apparent from a consideration of the following detailed description and the application drawings in which like reference numerals indicate like parts throughout the several views.

However, it is to be distinctly understood that the specific drawing illustrations provided are supplied to comply with the requirements of the Patent Laws, and that the invention is susceptible of other embodiments that will be obvious to those skilled in the art, and which are intended to be covered by the appended claims.

Figure 1:
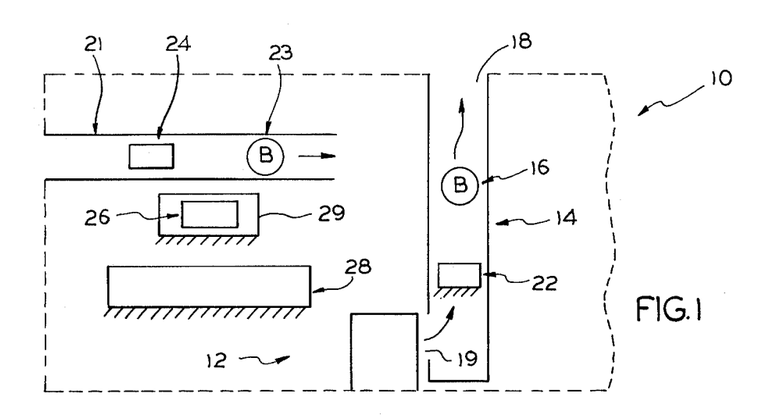
FIG. 1 is a diagrammatic view showing in rough fragmental vertical section the general layout of a portion of a building having cooking facilities of the type indicated, an exhaust stack therefor, a fresh air intake duct, and a storage tank for water to be supplied to the building facility hot water system.

The showing of FIG. 1 is provided to diagrammatically illustrate a typical practical application of the principles of this invention in which reference numeral 10 generally indicates a building housing a restaurant type cooking facility generally indicated by reference numeral 12 and shown in block diagram form, which is intended to represent a griddle or other type of open cooking that in use is intended to be in continuous operation for a long period of time during the work day. Typically, the building 10 is equipped with a stack or flue 14 provided with a suitable blower apparatus 16 for impelling air outwardly of the stack and through stack discharge opening 18 suitably formed in the roof of the building 10, whereby air ambient to the cooking facility 12 is drawn into the stack 14 through suitable stack intake opening 19 and discharged to the atmosphere through stack opening 18.

The building 10 is also typically equipped with a fresh air intake duct 21 having a suitable blower apparatus 23 mounted therein for impelling fresh incoming air into the building 10 for the usual ventilating purposes.

Figures 2, 2A:
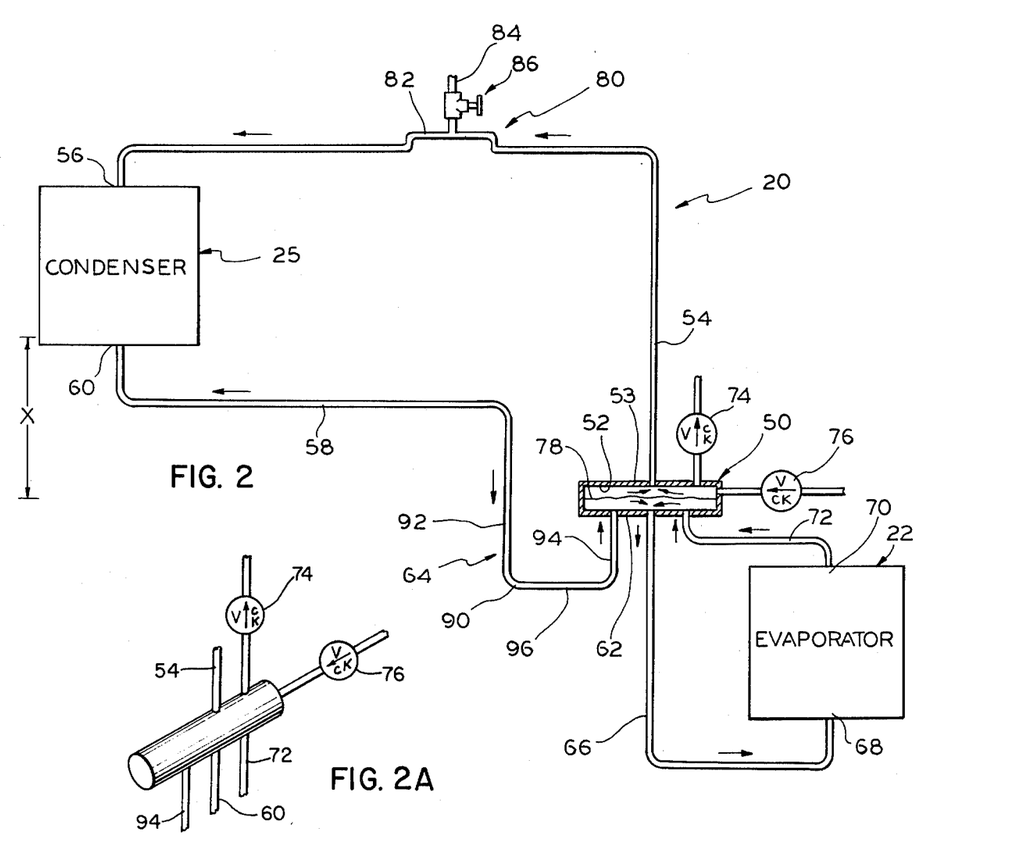
FIG. 2 is a diagrammatic view in elevation illustrating in largely block diagram form the general arrangement of the basic heat recycling system that forms the subject of the present invention.
FIG. 2A is a diagrammatic perspective view in elevation of the receiver of FIG. 2.

In accordance with the invention, the building 10 is equipped with the closed circuit heat generated refrigerant flow type heat exchange system comprising the invention, the basic arrangement of which is diagrammatically illustrated in FIG. 2 and indicated by reference numeral 20. The system 20 generally comprises evaporator 22 (forming the system heat source) that may be in the form of one of the heat recovery or absorption coils illustrated in other figures of the drawings, suitably mounted in stack 14 and cooperatively related by incorporation in the system 20 to transfer, from the evaporator, heat to condenser 25 (forming the system heat sink) which may take the form of heat transfer coil 24 of FIGS. 1 and 3 suitably mounted in the air intake duct 21 in heat discharge relation thereto, or heat transfer coil 26 (arranged as indicated in FIG. 4) suitably mounted in heat discharge relation to the water of water holding tank 28 (which is assumed to be the building water storage tank) suitably supported in the building 10. The water of tank 28, in accordance with the invention, for water tempering or preheating purposes, is connected to refrigerant receiving water tempering chamber 29 which the coil 26 is mounted, as more specifically illustrated in FIG. 4, by suitable inflow and outflow conduits 30 and 32 that are series connected to coil 26 for conducting the water flow therethrough to and from tank 28, the diagrammatic illustration of which is provided in FIG. 4.

In the diagrammatic showing of FIG. 1, the conduiting of the heat exchange systems that may be employed in accordance with the invention is not shown to simplify the drawing, with the other figures of the drawings being provided to show the essentials of the system layouts involved.

The coils 22, 24, 26 may be of any type suitable for use as evaporators and condensers for refrigeration system type heat exchange and heat transfer purposes. They thus may take the familiar form illustrated for coils 22 and 24 in FIGS. 3-5 and thus comprise lengths of copper tubing shaped to have the sinuous rounded shaping indicated, that is usually associated with heat exchange coils. Coil 22 is shown in another familiar form in FIG. 4 comprising intake end manifold 40 and discharge or outflow end manifold 48 connected by spaced grid pipes 43. Therefore, the term "coil" as used in this disclosure and appended claims is intended to mean these well known types of heat exchangers and their equivalents that may be used for evaporator and condenser purposes.

In accordance with the basic principles of the invention, as diagrammatically illustrated in FIG. 2, the evaporator takes the form of one of the heat exchange coils 22 serving as a heat recovery coil that may be mounted in heat transfer relation with the source of heat, as by being mounted as indicated in stack 14. The heat recovery coil serving as evaporator 22 should be mounted at a lower level in the building 10 below the horizontal levels of the heat transfer coils 24 and 26. Suitably mounted adjacent the level of the heat recovery coil 22 is receiver 50 that in its preferred form is cylindrical in configuration and elongate longitudinally of its longitudinal axis, with the receiver being disposed so that its longitudinal axis is horizontally disposed, as indicated in FIG. 2. Receiver 50 is formed to define refrigerant receiving chamber 52 that has its length dimension proportioned to exceed its height dimension by a proportion on the order of 4 to 1. Refrigerant outflow conduit 54 communicates the receiver chamber 52, from the upper or top side 53 of the receiver, with the intake end 56 of the condenser 25, while return conduit 58 connects the outlet end 60 of the condenser 25 with the receiver chamber 52 through the lower or bottom side 62 of the receiver through the liquid trap formed in conduit 58 where indicated at 64.

Supply conduit 66 communicates the receiver chamber 52 through the lower side 62 thereof to the intake end 68 of the evaporator and the outlet or outflow end 70 of the evaporator communicates with the receiver chamber 52 by recycle conduit 72 through the lower side 62 of the receiver.

In practicing the invention, assuming that the basic component parts of the refrigeration system as illustrated in FIG. 2 are installed for practical operation, the refrigeration system 20 is fully charged with refrigerant that is preferably of the halogenated hydrocarbon type (of which the Freons are an example) by suitably evacuating the system as at the receiver, and through a suitable check valve 74, after which the refrigerant in its liquid phase is pumped into the system through check valve 76 to bring the liquid level of the liquid refrigerant within the system 20 up to and within receiver 50, as indicated at 78. This is done, of course, when the heat source is not operating.

In this connection, it is important that the receiver 50, in being disposed adjacent the level of the evaporator 22, it should be so elevationally related to the evaporator 22 that the liquid level of the liquid refrigerant within the receiver chamber 52 be above the horizontal level of the outlet or outflow end 70 of the evaporator 22 in the dormant condition of the system; the receiver 50 should also be positioned relative to the condenser so that the liquid level 78 in the receiver 50 is sufficiently below the outlet or outflow end 60 of the condenser 25 in the dormant condition of the system, such that liquid refrigerant will return under gravity by liquid flow through return conduiting against the pressure within receiver 50, as explained in detail hereinafter.

After the system is charged with the refrigerant as indicated, the receiver 50 is suitably sealed and the system is suitably vented to removed trapped air from the system. This may be done by employing the high point vent arrangement indicated at 80 in FIG. 2 in which the outflow conduiting 54 is provided with a high point portion 82 equipped with a suitable vent 84 controlled by suitable off-on valve 86, which valve 86 is closed to seal the system 20 after initial air venting.

In operation, assuming that the evaporator 22 is exposed to the source of heat, and the condenser 25 is exposed to the fluid to be heated or other heat sink, the heat input at the evaporator 22 starts vaporization of the liquid refrigerant in the evaporator with the result that the refrigerant in the evaporator becomes lighter than the liquid refrigerant in the receiver and the evaporator supply conduit 66, so that a liquid refrigerant circulation system starts whereby refrigerant leaving the evaporator 22 through conduit 72 is in mixed liquid-gaseous form and enters the receiver 50, thereby inducing liquid refrigerant flow from the lower side 62 of the receiver through supply conduit 66 and back into the evaporator at its intake or inflow end 68. This recirculation of the refrigerant between the evaporator and the receiver continues during operation of the refrigerant system.

The vaporized refrigerant entering the receiver rises to and through the liquid level 78 of the refrigerant in the receiver and builds up pressure in the receiver to the point that the heat charged vaporized refrigerant passes through outlet flow conduit 54 into the intake or inflow end 56 of the condenser 25, thence through the condenser where the refrigerant condenses to give off its heat and leaves the condenser in liquid form at the condenser outflow end 60 for return under gravity through conduit 58 to receiver 50 for recycling through the system.

The liquid refrigerant trap 64 through which the heat depleted refrigerant returns to the receiver comprises a bight portion 90 formed in the conduiting 58 that is of upright U configuration comprising upstanding leg portions 92 and 94 serially connected by connecting portion 96. The conduiting portions 92, 94 and 96 are fully opened throughout the length of same to provide for free flow therethrough of the liquid refrigerant under the head that exists on the liquid refrigerant in the return conduiting 58 by reason of the elevation of the condenser 25 above the receiver 50. However, the quantity of liquid refrigerant that is retained by the action of gravity within the trap 64 resists refrigerant reverse flow tendencies that may occur in the system during operation of same and insures that the refrigerant flow rates and efficiency desired for a particular installation are obtained.

In accordance with the present invention, the horizontal level of the liquid trap 64 is adjacent the level of the receiver 50, with the connecting conduit portion 96 disposed below the lower or under side 62 of the receiver 50. The length of the trap connecting portion 96 is not critical and may be of substantial length; however, the upstanding leg portion 92 on the condenser side of the trap extends adequately above the top side 53 of the receiver 50 to fully resist refrigerant reverse flow tendencies in the direction of the condenser 25; thus, the trap leg portion 92 exceeds the length of the trap leg portion 94 on the receiver side of the trap.

In the practice of the invention in the diagrammatically illustrated structural environmental background shown in FIG. 1, it is preferred that the temperature at the locale of the heat recovery coil 22 within the stack 14 be preferably in the range of from approximately 200 degrees F. to approximately 300 degrees F. It is to be understood that numerous other practical applications of the system are possible, however, using lower or higher temperature heat sources that may lie in the wider range of from approximately 100 degrees F. to approximately 600 degrees F. (as will be hereinafter referred to), though for most Freons, the recommended maximum continuous operating temperature for the refrigerant is 225 degrees F. (this in practice being subject to a number of variables, such as the materials from which the evaporator and condenser coil are made, the cleanliness of the system, and the specific refrigerant being used).

It will be found in practice that the refrigerant of the system 20 cycles through the coils forming the evaporator 22 and condenser 25 in a run-around type relation, with the recycling accelerating in proportion to the differences in the temperature at the locales of the evaporator 22 and the condenser 25. This acceleration effect reaches a maximum that will depend upon the refrigerant employed in the system, the heat input to the system at the heat recovery coil 22, and the heat outflow from the system at the condenser 25, and the size of the conduiting employed.

More specifically, on start up of the system, liquid refrigerant evaporates in the evaporator as heat is absorbed by it, and passes together with the liquid refrigerant recirculating flow through conduit 72 to receiver 50. The vaporized refrigerant rises to the top side of the receiver and passes through conduit 54 to condenser 25 where it condenses to give up its stored heat and returns in liquid phase form under gravity through the return conduit 58 and its trap 64 to receiver 50. As the refrigerant system goes into operation, a pressure differential builds up between the outflow end 60 of the condenser and the pressure within the receiver; this pressure differential and the speed of the refrigerant cycling through the system will increase, as the temperature at the locale of the evaporator 22 rises relative to the temperature at the locale of the condenser 25, until a balance point, or maximum pressure difference level is reached, to provide the optimum or maximum speed of refrigeration cycling within the system 20 for a given installation. This balance point will depend upon the specific refrigerant employed, the amount of liquid level head between the level 78 of the refrigerant liquid in receiver 50 and the level of the liquid refrigerant at the condenser, the amount of heat input to the system at the evaporator, the amount of heat output of the system at the condenser, and the size of the piping employed to form the illustrated conduiting. Generally speaking, the refrigerant vapor flow action to the condenser is proportional to the heat recovery achieved.

The refrigerant preferred for practicing the invention are the halogenated hydrocarbons, familiar commercial examples of which are the Freons, such as Freon 11, 12, 21, 22, 113, and 114; these Freons or combinations of same are non-toxic, non-corrosive, and non-flammable and are thus highly suitable for practice of the invention, with the specific refrigerant employed depending on the application. As indicated in the drawings, the system 20 is of the closed, non-mechanical pump, refrigeration type in which the flow of the refrigerant through the system is generated by the application of heat to the evaporator 22 and a gravity return from the condenser that operates with sufficient head to overcome the pressure in the receiver for continuous liquid refrigerant return to the receiver. Of course, the conduiting heat exchange coils comprising the evaporator and condenser, the conduits and chambers through which the refrigerant flow, and the various connections involved should be fluid tight throughout the system 20 in operation of the system to keep the refrigerant charge of constant amount and free of impurities.

The recirculating liquid refrigerant flow that occurs between the evaporator 22 and the receiver 50 during operation of the system has the effect of effecting forced flow of the refrigerant through the evaporator and thereby achieves a continuous movement of the refrigerant through the evaporator at a rate faster than the refrigerant would normally move as a result of the movement rate being solely induced by evaporation at the evaporator such that the refrigerant would leave the evaporator fully vaporized. The liquid refrigerant flow through and from the evaporator carries with it the vaporized refrigerant, thereby eliminating the formation of undesirable hot spots and prevents undesirable superheating of the vaporized refrigerant, thereby resulting in speeded up heat transfer characteristics and uniform heat absorption at the evaporator.

It is fundamental to this system that the level of the liquid refrigerant at the condenser be sufficiently above the level of the liquid level 78 in the receiver 52 such that the pressure in the receiver will be overcome by the "head" of the liquid refrigerant involved, for liquid refrigerant flow under gravity into the receiver. The liquid refrigerant head involved is the vertical distance between the liquid level 78 in the receiver and the corresponding liquid level of the refrigerant, represented by dimension "X" of FIG. 2, and this head must exceed that which would balance against the pressure in the receiver. Thus, the level of the liquid refrigerant on the condenser side of the trap 64 must be sufficiently above the receiver liquid level 78 so that the head X of the liquid involved will more than balance against the pressure in the receiver (which must be greater than the pressure in the evaporator to effect vapor flow to the evaporator, with the pressure differential involved ordinarily being somewhat less than one psi; thus, the head X must exceed that which would equal the pressure differential between pressures within the receiver and the condenser.

The horizontal disposition of the receiver 50 relative to its longitudinal axis disposes the liquid level 78 of the refrigerant across the dimension of maximum area of the chamber 52. Since the level 78 is more or less aligned with the horizontal axis of receiver 50, and the receiver 50 is in cylindrical form, the area of the liquid level 78 roughly corresponds to the area of a horizontal plane intersecting the longitudinal center axis of the receiver 50, as delineated by the internal side and end wall surfacing of the receiver that defines the chamber 52. This maximized area of the liquid level 78 minimizes the vertical fluctuation of the level 78 within receiver 50 and makes for increased stability of the head X.

Figure 3:
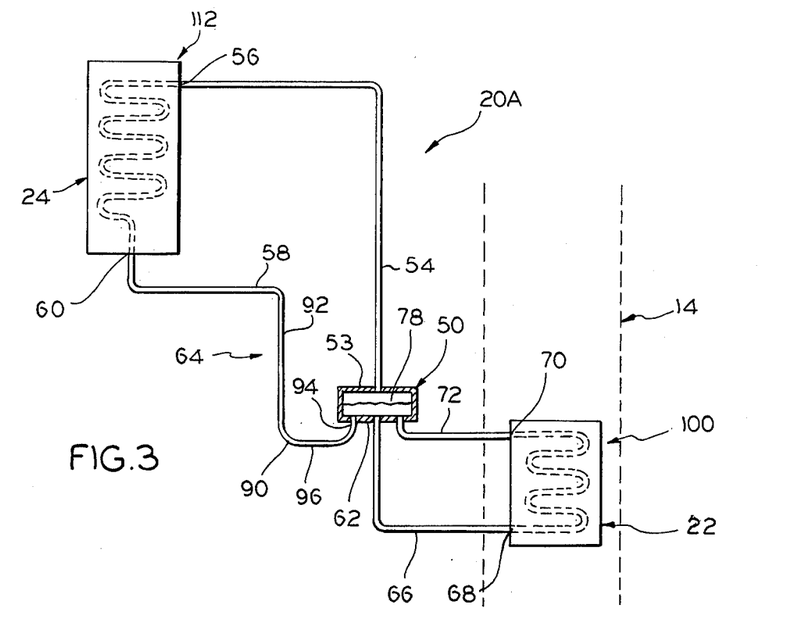
FIG. 3 is a view similar to that of FIG. 2, but shows the system of FIG. 2 applied to heat the incoming fresh air of the air intake duct indicated in FIG. 1.
Figure 4:
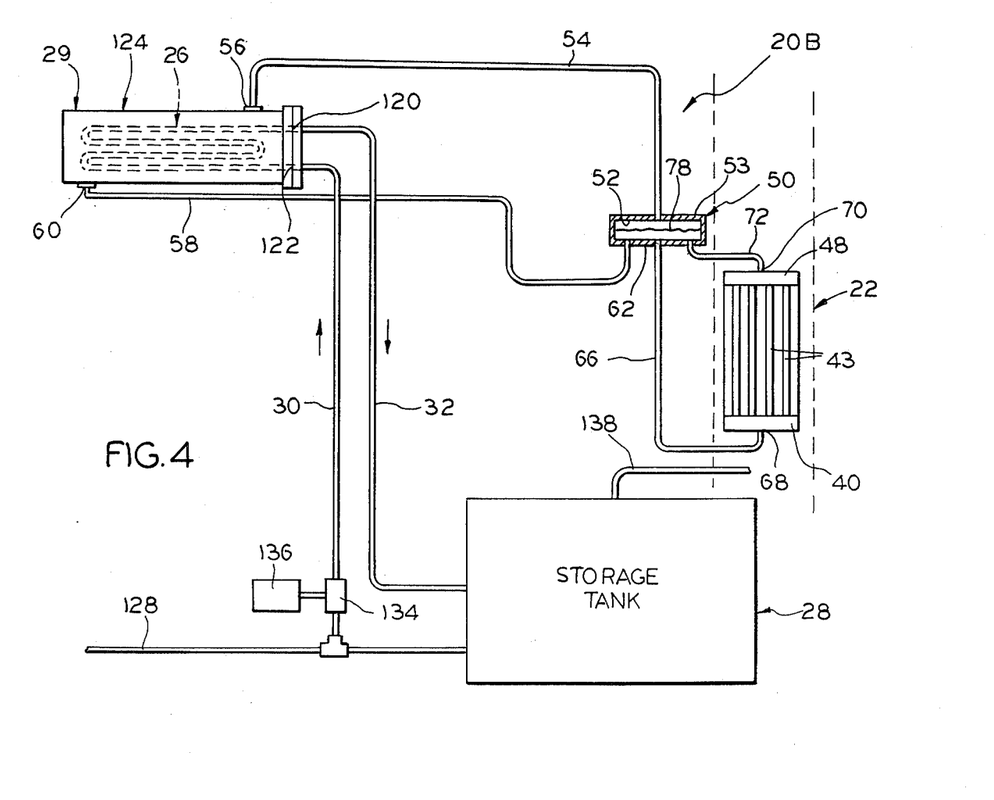
FIG. 4 is similar to FIG. 3, but shows the invention as employed for heating the storage tank water of the building arrangement of FIG. 1.

In the showing of FIG. 3, system 20A is basically the same as system 20, with the valving 76 and 74 omitted as well as the high point venting arrangement 80, for simplicity of illustration. The coil 22 is shown applied to stack 14. In the form of FIG. 3, the coil 22 is of the sinuous rounded shaping type incorporated in a suitable frame 100 that is suitably mounted in stack 14 in the path of the fluid flow through stack 14.

The coil 24 representing the condenser 25 of FIG. 2 is also of the sinuous rounded shaping type and is suitably incorporated in suitable frame 112 that is appropriately mounted within the duct 21 in the path of the fluid flow through duct 21.

The remaining components of FIG. 3 bear reference numerals corresponding to the already described components of the basic system shown in FIG. 2.

In practicing the invention as represented by the embodiment of FIG. 3, the instituting of heat flow out of the stack 14 by the operation of the cooking equipment 12 and the operation of blowers 16 and 23 effects the aforedescribed operation of the refrigeration system whereby the heat recovery coil 22 absorbs heat from the stack 14 and releases heat to the incoming air of duct 21 at heat discharge coil 24, as the refrigeration 20A cycles.

Another example of the utility of system 20A is its adaption to supply heat to the basement of a residence from the residence furnace stack or flue. In such an arrangement, coil 22 is mounted in the flue as suggested in FIG. 3, and the coil 24 is exposed to the ambient air of the basement, which is preferably blown against the coil 24 by a fan for maximizing the heat discharge at the condenser, comparable to the showing of the coil 24 in FIG. 1.

In the system 20B of FIG. 4, the refrigeration system involved supplies recovered stack heat to temper the water of chamber 29, and thus to coil 26. The coil 26 is suitably mounted within the chamber 29 in a convenient manner for intimate heat transfer relation with the water supplied to chamber 29 from water storage tank 28 through the conduits 30 and 32 that are connected to the intake and discharge ends 120 and 122 of the coil 26. The refrigerant outflow conduit 54 has its discharge end suitably connected to the intake 56 of chamber 29 and the refrigerant return conduit 58 has its intake end suitably connected to outlet 60 of the chamber 29 so that the coil 26, which is mounted within the chamber 29, is fully blanketed and immersed in the refrigerant flow passing through the interior of chamber 29 between the conduits 54 and 58. The refrigerant within chamber 29 is thus in heat transfer relation to the coil 26 through which the water from tank 28 flows for being heated within the chamber 29 for water tempering purposes.

The chamber 29 may be in the form of a suitable refrigerant confining container or vessel 124 suitably mounted in the building 10 and having the coil 26 suitably supported in same for the indicated connection with the conduits 30 and 32. The container 124 is thus hollow for refrigerant fluid flow therethrough between the inlet 56 and the outlet 60 whereby the coil 26 is thus immersed in fluid refrigerant that bears the recovered heat for transmittal through the tubing walls defining the coil 26 to the water flowing therethrough via the conduits 30 and 32.

In the showing of FIG. 4, the water storage tank 28 is shown supplied with water through conduit 128, which leads from connection to the usual water mains. When system 20B is operating, suitable pump 134 operated by motor 136 pumps the incoming water from pipe 128 through conduit 30, coil 26, and conduit 32 and thence to the storage tank 28. Conduit 138 leads to the hot water heater.

In the system 20B, the heat recovery coil 22 is of the spaced grid pipe type already described and is suitably mounted in stack 14. The system 20B functions as described in connection with the showing of FIG. 2 to supply heat charged refrigerant to the chamber 29 which serves as the means for exposing the heat charged refrigerant to heat transfer coil 26 for tempering the water of storage tank 28. Manifestly, the water tempering temperature achieved for the water of storage tank 28 by the operation of system 20B reduces the heating requirements for hot water heating of the water passed to the building hot water heater through conduit 138.

Figure 5:
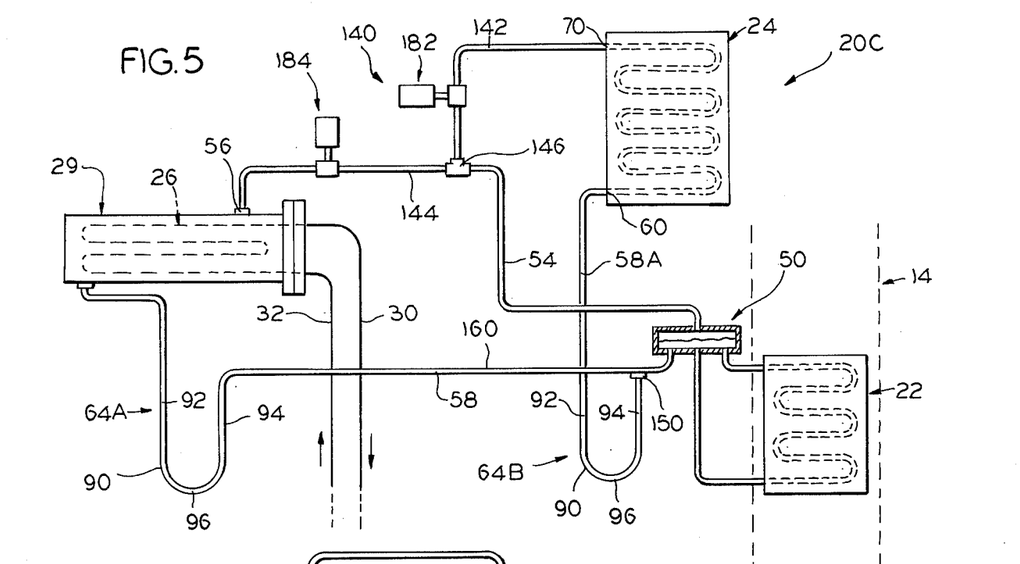
FIG. 5 is a view similar to those of FIGS. 3 and 4 showing the systems of FIGS. 3 and 4 combined in association with thermostatically operated control valves for alternate supply of heat from the stack to either the building incoming fresh air, or to the storage tank water, depending on the outside ambient temperature level exteriorily of the building.
Figure 6:
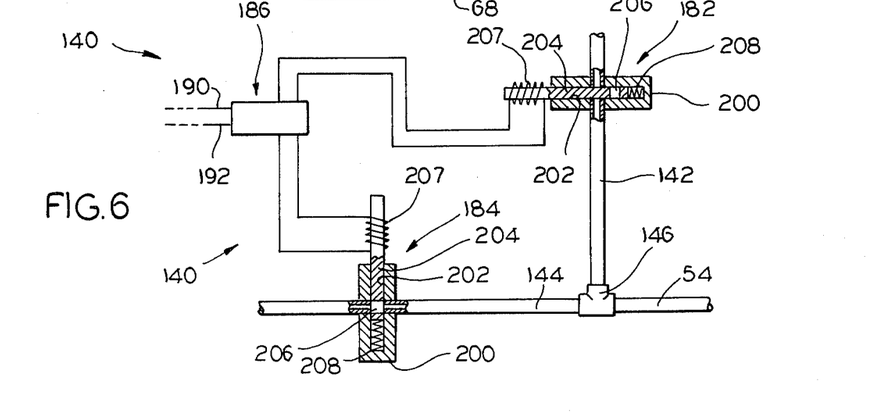
FIG. 6 is a fragmental view that is largely diagrammatic in nature illustrating a thermostatically operated control arrangement for the system of FIG. 5.

In the refrigeration system 20C of FIGS. 5 and 6, the systems 20A and 20B are combined for alternate operation under the control of the thermostatically operated control arrangement 140 of FIG. 6. For this purpose, the refrigerant outflow conduit 54 has a branch 142 that is connected to the intake or inflow end of the coil 24, and a branch 144 that is connected to the chamber 29 at its refrigerant inlet 56. The outlet flow conduit branches 142 and 144 are suitably coupled together by suitable joint 146.

Return conduit 58 has connected to same a return conduit 58A, as at connection fitting 150, with the inflow end of the conduit 58A being connected to the outflow end 60 of the coil 24.

The return conduits 58 and 58A are each formed with a liquid trap, indicated at 64A and 64B, that has the same component parts as trap 64 of system 20, as indicated by corresponding reference numerals. In the form illustrated in FIG. 5, the trap 64A of conduit 58 is spaced from the receiver 50 and connected thereto by horizontal line portion 160 to which the leg portion 94 of trap 64B is connected by fitting 150, whereby the heat depleted liquid refrigerant returns to receiver 50 from the respective coils 24 and 26 when the latter are in operation.

In accordance with the embodiment of FIG. 5, it is intended that the heat recovered at coil 22, from the waste heat leaving stack 14, be released at either coil 24 or 26, depending on temperature conditions of the ambient air external to the building 10. For this arrangement, the thermostatically operated control arrangement 140 of FIG. 6 (or its equivalent) is employed, which is largely block diagram illustrated, and for purposes of illustration is shown to comprise a solenoid operated off-on valve 182 incorporated in the conduit branch 142, and a similar solenoid operated off-on valve 184 incorporated in conduit branch 144; the valves 182 and 184 are electrically operated from thermostatically operated control box 186 that is electrically and thermostatically arranged so that when the temperature of the ambient air externally of the building 10 is above a predetermined level, such as 60 degrees F., the valve 182 closes the discharge coil 24 from communication with the heat recovery coil 22, while the valve 184 opens and maintains the chamber 29 (in which is mounted heat discharge coil 26) in open communication with the heat recovery coil 22. When the temperature of the ambient air externally of the building 10 is below such selected level, the positions of the valves 182 and 184 are reversed by the operation of box 186.

The control box 86 may be of any suitable type that includes suitable means for sensing or being responsive to the temperature of the ambient air externally of the building 10, and that includes suitable means for alternately connecting the valves 182 and 184 (in response to said sensing means) to the suitable source of electrical energy that is to be made available for this purpose through connection thereto by suitable lead lines 190 and 192.

FIG. 6 shows the condition where the ambient temperature externally of the building is above the predetermined temperature level, whereby the control device arrangement 140 connects the chamber 29 to heat recovery coil 22 to expose the refrigerant flow to coil 26 for purposes of tempering the water of tank 28. When the ambient temperature level referred to drops below the predetermined level, the positions of the valves 182 and 184 reverse to disconnect the chamber 29 from coil 22 and connect the coil 24 to the coil 22 for refrigerant fluid flow thereto for application of the recovered heat to the fresh air being taken into the building through conduit 21.

The valves 182 and 184 each comprise, in the simplified form shown, a suitable valve body 200 defining valve chamber or bore 202 that reciprocably receives valve stem 204 formed with aperture 206 that is to be disposed in the position of valve 184 to permit communication between the upstream and downstream portions of the respective conduit branches 142 and 144, and that is to be disposed in the position of the valve 182 to block communication between the upstream and downstream segments of such conduit branches. For this purpose, the valve stems 204 are shown operably associated with suitable solenoid coils 207 and arranged in the manner indicated for energization of the coils 207 to move the respective valve stems 204 to the flow blocking positions indicated against the action of biasing springs 208.

The biasing springs 108 serve the function of biasing the respective valve stems 204, when the respective coils 207 are deenergized, whereby at the apertures 206 of the respective stems 204 are aligned with the respective conduit segments 142 and 144 for permitting fluid flow therethrough.

In practice, the control device 180 and its valves 182 and 184 may take the form of any conventional equipment that will provide the functions indicated.

In operation, assuming that the ambient temperature externally of the building is below the selected level, on start up of the system, by instituting heat flow out of the stack 14, the heat discharge coil 24 is connected to the heat recovery coil 22 while the chamber 29 is disconnected therefrom by the operation of the control device 180 (thus isolating coil 26 from coil 22). The coils 22 and 24 and their associated parts function in the manner described with reference to system 20A of FIG. 3. For normal operation, the heat source for coil 22, represented by stack 14 in the illustrated embodiments, should be substantially constant for uniform operation of the heat pump type refrigeration system involved. The temperature in the locale of the heat recovery coil within the stack 14 is preferably in the range of from approximately 300 degrees F. to approximately 600 degrees F. for the particular type of installation illustrated. In any event, the heat source represented by the stack 14 should provide a temperature level in the locale of the coil 22, relative to the temperature levels to be expected at the locale of the coil 24, such that the maximum refrigerant cycling effect contemplated by this invention will be achieved. When this is observed, up to 80 percent of the input heat at coil 22, in terms of BTU's per unit of time, can be recovered from waste stack heat, depending on the heat draw up available to the system.

As indicated, when the ambient air temperature external to the building 10 rises to exceed the indicated predetermined level, the positioning of the valves 182 and 184 reverse to disconnect the coil 24 from coil 22 and connect the chamber 29 thereto. The system 20C then operates in the manner described with reference to FIG. 4 to supply heat to the water from the storage tank 28 passing through the coil 26, so long as the temperature of the ambient air externally of the building 10 remains at a level above the indicated predetermined level.

Figure 7:
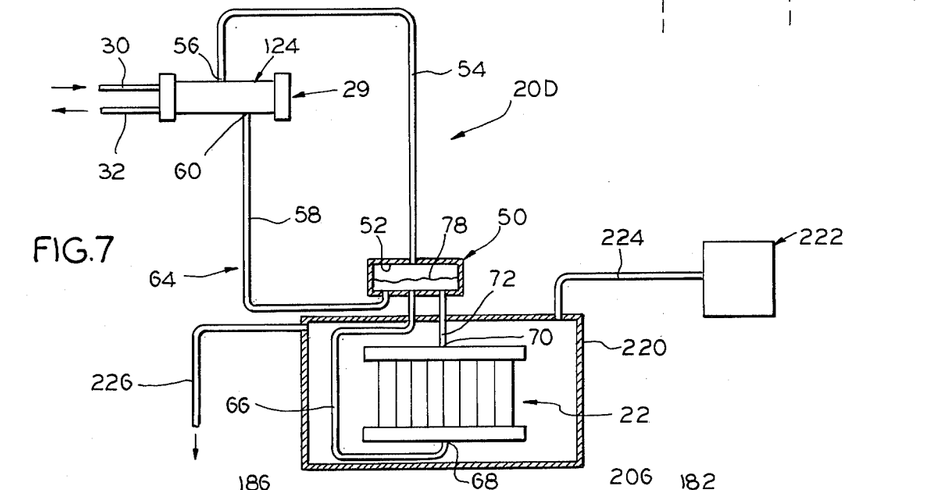
FIG. 7 is a view similar to that of FIG. 2 illustrating another embodiment of the invention employed to recover heat from waste hot water and supply it to the building storage tank water.

The system 20D of FIG. 7 is essentially the same as system 20B, with the coil 22 that serves as the evaporator 22 of the basic arrangement shown in FIG. 1 being suitably mounted in a water collection tank 220 which is supplied with water containing waste heat from any source, such as an automatic dish washing machine or clothes washing machine, indicated in block diagram form at 222, through suitable conduit 224, under the pumping action of the automatic equipment represented at 222. Suitable outlet conduit 226 provides for removal of the waste water from the tank 220 to a suitable point of disclosure, such as a floor drain or the like leading to a sewer.

The receiver 50 of system 20D is operably connected to chamber 29 in the manner indicated in FIGS. 4 and 7 for supplying heat to water being passed through chamber 29 from a storage tank 28.

When the washing machine 222 discharges its waste water into tank 220, it displaces the water ahead of it out of the tank through outlet conduit 226. The fresh supply of waste water in the tank 220 supplies the waste heat to be absorbed at the coil 22 for heating the water passing through the chamber 29 in the manner described with reference to FIG. 4. The system 20D functions when there is sufficient heat in the water within the tank 220 to vaporize the refrigerant in coil 22. When the temperature of the water in tank 220 drops below that level, the system 20D automatically shuts down, and automatically reactivates when a fresh supply of heated water is passed into the tank 220. The operation of the motor 136 of pump 134 (see FIG. 4) may be controlled to be in suitable timed relation to the operation of washer 222.

Figures 8, 9:
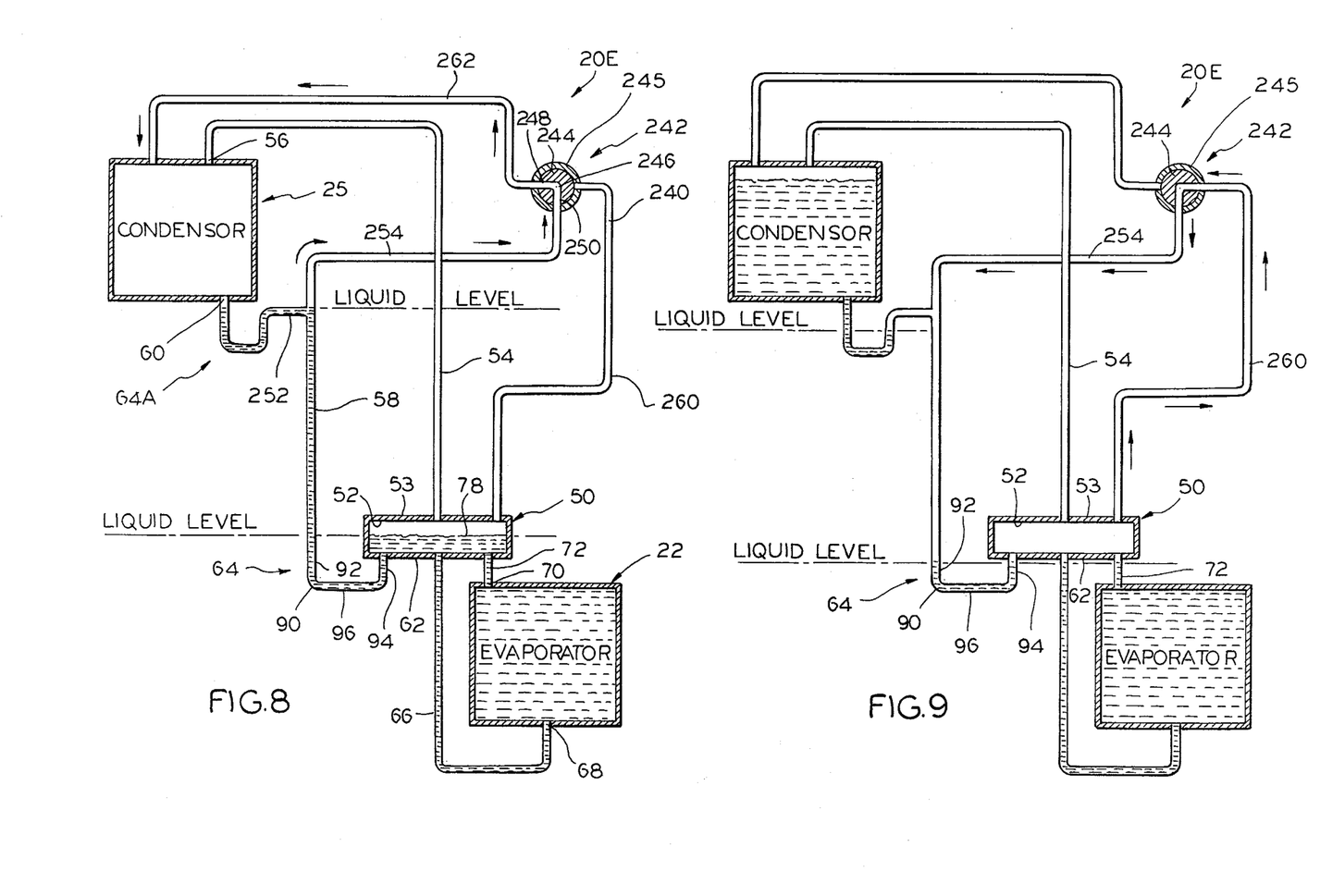
FIGS. 8 and 9 are views similar to that of FIG. 2 illustrating a modified refrigeration system arrangement for effecting discontinuance of the refrigerant flow through the system without having to discontinue the source of heat at the heat recovery coil.

The system 20E of FIGS. 8 and 9 is a modified version of the basic system 20, with like parts being indicated by like reference numerals. In addition, the evaporator 22 and the condenser 25 are represented in container form, appropriately labeled, to indicate parts that are occupied by a liquid refrigerant in the alternate conditions of operation of the system. The refrigerant conduits involved are also diagrammed to indicate liquid refrigerant phase content, to distinguish this from gaseous phase content.

The system 20E in addition to the outflow conduiting 54, the return conduiting 58, and its liquid trap 64, supply conduit 66, and recycle conduit 72, includes a by-pass conduit 240 extending from the upper side 53 of the receiver to the condenser 25, and that is interrupted by the suitable three way valve 242 that is diagrammatically illustrated as including a rotor 244 being formed with a right angled conduit passage 246 therethrough having arm portions 248 and 250. The valve rotor 244 is journalled in leak free relation in suitable housing 245.

The return conduiting 58 is formed with a second liquid trap 64A that is generally similar to trap 64, as indicated by corresponding reference numerals, and that is connected to horizontal conduit portion 252 that is in turn connected to a vapor vent conduit 254 which extends to communication with the valve 242 in the manner indicated in FIGS. 8 and 9. Valve housing 245 is suitably ported for the indicated alignment of the rotor conduit passage with conduits 240 and 254.

The general arrangement of the system 20E is to provide for a shut down of the heat pumping function of the refrigeration system when the temperature of the refrigerant leaving the evaporator reaches a predetermined low level. For this purpose, valve 242 is controlled thermostatically in any suitable manner to position the valve 242 as shown in FIG. 8 when the temperature level of the refrigerant leaving evaporator 22 is above the indicated temperature level, and to switch the valve 242 to the position of FIG. 9 when the indicated temperature drops below the indicated temperature level.

Thus, in the normal functioning of the refrigeration system 20E, the upstream segment 260 of bypass conduit 240 is disconnected from its downstream segment 262, with the passage 246 of the valve rotor member 244 connecting the conduit 254 with the bypass conduit downstream segment 262 whereby vaporized refrigerant in the return conduit 58 may vent back to the condenser.

However, when the indicated temperature level of the refrigerant leaving the evaporator 22 drops below the indicated predetermined temperature level, the position of the valve 242 changes to the position of FIG. 9, which connects the upstream segment 260 of the bypass conduit 240 to the vent line 254 via the passage 246 of the valve rotor 244. The downstream segment 262 of the bypass conduit 240 is thus cut off from the receiver 50. In this condition of the system 20E, the vaporized refrigerant from receiver 50 is supplied directly into return conduit 58 under pressure, thus interrupting the liquid refrigerant return flow from the condenser and resulting in the holding of the liquid refrigerant in the condenser in which it builds up as the condenser continues to be supplied with vaporized refrigerant through outflow conduit 54. At the receiver, the level of the liquid refrigerant gradually drops until all the liquid refrigerant has disappeared from the receiver, and the evaporator, supply conduit 66, and recycle conduit 72, are filled with the liquid refrigerant, as well as the lower portion of the liquid trap 64, as indicated in FIG. 9.

In this condition of the system 20E as represented by FIG. 9, the source of heat applied to the evaporator may continue but there will be no heat transfer function, as the condition of system 20E as shown in FIG. 9 will remain until the temperature level of the refrigerant in recycle conduit 72 rises above the indicated temperature level, at which point the position of the valve 242 reverses to the position of FIG. 8 for recommencing of the heat transfer function of the system 20E.

A specific application of the system 20E is for an application where the evaporator 22 is to be exposed to, for instance, a source of heat involving moist air at 100 degrees F., and the condenser is exposed to a low temperature, such as 0 degrees F. or below. Under these conditions, the temperature of the liquid refrigerant entering the evaporator 22 may very well be below water freezing temperatures, which can result in the moist air at the evaporator depositing on the evaporator coils in the form of frost or ice that would impede the heat transfer action. Under these conditions, the valve 242 and associated parts function in the nature of a defrost control that maintains the coils of the evaporator 22 free of icing by providing the necessary off-on control through the suitable thermostatically operated arrangement effecting the changing of the valve 242 in the manner indicated. Operation of valve 242 may be effected by a suitable thermostatically controlled switching arranged suitably thermally associated with conduit 72, as will be apparent to those skilled in the art. Of course, valve 242 may be controlled for operation by temperature conditions at other sites, such as the temperature ambient to the condenser, depending on the application.

It will therefore be seen that the invention provides a refrigeration system type heat exchange system for recycling waste heat, such as stack heat, to recover much of the waste heat and apply it in an efficient manner to fluid needing heat, such as water held in storage for supply to a hot water heater or the heating of incoming cold air, or heating basements, etc. The basic refrigerant system involved is free of any mechanical pumping or compressor requirements, with the refrigerant flow being induced by the heat at the heat source associated with the evaporator, and the action of gravity on the liquid refrigerant being relied on to return the refrigerant to the evaporator.

The illustrated applications of the basic system are to be considered as indicating only a few of the practical applications of the basic system. From the standpoint of fundamentals, the same basic system will operate to transfer heat from any source that will accommodate an evaporator 28 and transfer the heat to any form of heat sink that will accommodate a condenser 25. Normally, for best results the heat source should be at a suitable constant temperature, which may be at any workable level considering the nature of the equipment involved, the refrigerant employed and its maximum recommended continuous operating temperatures, and the application. For instance, the heat source in practical application may vary from well below room temperature to about 600 degrees F., the basic requirement being that the heat source temperature be higher than the heat sink temperature, but not so high as to destroy or damage the evaporator. However, the heat source for some applications will be intermittent, as illustrated by the embodiment of FIG. 7.

A basic characteristic of the system of this invention is that if the heat source temperature should drop below that at the heat sink, the heat transfer involved ceases and does not reverse. The basic system is also, in operation, the opposite of heat pump systems which require the energy input of a compressor to function.

The basic system involved by its nature will operate continuously so long as the refrigerant conduiting involved remains open to the flow of refrigerant and the source of heat is maintained at a sufficient level to evaporate the refrigerant in the evaporator. However, the system is adapted for supplying heat to alternate sites, as indicated by the form of FIG. 5, and the form of FIGS. 8 and 9 permits a discontinuance of the heat pumping function of the system under the conditions indicated without having to shut down the source of heat acting on the evaporator.

The arrangement of the system to provide the recycling of the refrigerant between the receiver and the evaporator makes a significant improvement in the heat transfer coefficient between the heating surfaces of the evaporator and the refrigerant due to the increased flow rates of the fluid involved as well as the turbulence occasioned by the mixed gaseous liquid refrigerant flow in the evaporator.

The refrigerant system of the invention as installed is completely sealed and normally requires no addition of refrigerant or any provision for deareation.

It will be apparent that in addition to the energy conservation applications that are illustrated, the basic system may be employed for pollution control purposes, as well as for providing for condensation of undesirable vapors by removal of heat therefrom, or for controlling industrial processes by providing for controlled heat transfer to or from a processing locale.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. Apparatus for supplying heat to a fluid from a source of heat remote from the fluid, said apparatus comprising:

a closed circuit heat generated refrigerant flow type refrigeration system and comprising:

an evaporator adapted to be disposed in heat exchange relation with the heat source and comprising a heat recovery coil having refrigerant intake and discharge ends for receiving heat depleted refrigerant and discharging heat charged refrigerant therefrom when in said heat exchange relation with the heat source, a condenser adapted to be disposed in heat transfer relation to the fluid at a level above that of said heat recovery coil, a liquid refrigerant receiver disposed at a horizontal level that is adjacent the horizontal level of said heat recovery coil and having upper and lower sides, outflow refrigerant flow conduiting communicating the upper end of said receiver with said condenser for supplying heat charged refrigerant thereto, return refrigerant flow conduiting communicating said condenser with the lower side of said receiver for flow thereto under gravity of liquid heat depleted refrigerant from said condenser to said receiver, supply refrigerant flow conduiting connecting the lower side of said receiver with the intake end of said heat recovery coil for supplying liquid heat depleted refrigerant from said receiver to said heat recovery coil, recycling refrigerant flow conduiting connecting the discharge end of said heat recover coil with the lower side of said receiver for returning heat charged refrigerant from said heat recovery coil to said receiver, said system being charged with a refrigerant such that the level of the liquid refrigerant, in the dormant state of said system is intermediate said sides of said receiver, with said heat recovery coil being disposed below said receiver liquid level, and with said condenser being above said receiver liquid level, whereby in the dormant state of said system said heat recovery coil is filled with liquid refrigerant, and when said heat recovery coil is in heat exchange relation to the heat source, sand said condenser is in heat transfer relation to the fluid, refrigerant flow through said system is induced by heat charging of the refrigerant at said heat recovery coil, liquid refrigerant recycles between said receiver and said heat recovery coil, the liquid refrigerant returning from the heat recovery coil to the receiver conveying heat charged refrigerant through and from the heat recovery coil to the receiver, heat charged vapor phase refrigerant communicates through said outflow conduiting from said receiver to said condenser, and heat depleted refrigerant communicates under gravity through said return conduiting from said condenser to said receiver, said return conduiting upstream of said receiver being shaped to define a liquid refrigerant trap comprising a vertically disposed bight portion of upright U-configuration that is free of refrigerant flow restrictions and connects said return conduiting to said receiver, said bight portion extending below said receiver lower side, said return conduiting adjacent said condenser being shaped to define a second liquid refrigerant trap comprising a vertically disposed bight portion of upright U-configuration that is free of refrigerant flow restrictions, said second trap bight portion having its refrigerant inflow leg connected to said condenser and its refrigerant outflow leg connected to a return conduiting high point vapor vent that is intermediate said traps, said second trap bight portion being disposed below said evaporator, a bypass conduit communicating between the upper side of said receiver and said condenser in parallel with said outflow conduiting, vapor vent conduiting communicating between said high point vapor vent and said bypass conduiting, three way valve means at the connection of said high point vapor vent and said bypass conduiting for alternately closing said bypass conduiting communication to said receiver and connecting said vent conduiting to said condenser through said bypass conduiting, or opening said bypass conduiting to full communication between said receiver and said condenser and closing the communication of said vapor vent conduiting to said bypass conduiting, and means for changing said valve between said positions for limiting the low point temperature of said heat recovery coil.

2. The apparatus set forth in claim 1 wherein:
said valve changing means is thermostatically controlled.

3. A building heat recovery arrangement for supplying heat to a fluid at a predetermined site within the building, said arrangement comprising:

a source of heat at an elevated constant temperature within the building, and a closed circuit fluid tight heat generated refrigerant flow type refrigeration system mounted in the building and comprising:

a heat recovery coil in heat exchange relation with said heat source and having refrigerant intake and discharge ends for receiving heat depleted refrigerant and discharging heat charged refrigerant therefrom, a condenser disposed in heat transfer relation to the fluid at a level above that of said heat recover coil, a liquid refrigerant receiver disposed at a horizontal level that is adjacent the horizontal level of said heat recovery coil and having upper and lower ends, outflow refrigerant flow conduiting communicating the upper end of said receiver with said condenser for supplying heat charged refrigerant thereto, return refrigerant flow conduiting communicating said condenser with the lower end of said receiver for flow thereto under gravity of liquid heat depleted refrigerant from said condenser to said receiver, supply refrigerant flow conduiting connecting the lower end of said receiver with the intake end of said heat recovery coil for supplying liquid heat depleted refrigerant from said receiver to said heat recovery coil, recycle refrigerant flow conduiting connecting the discharge end of said heat recovery coil with the lower end of said receiver for returning heat charged refrigerant from said heat recovery coil to said receiver, said system being charged with a refrigerant such that the level of the liquid refrigerant, in the dormant state of said system is intermediate said ends of said receiver, with said heat recovery coil being disposed below said receiver liquid level, and with said condenser being above said receiver liquid level, whereby in the dormant state of said system said heat recovery coil is filled with liquid refrigerant, and when said heat source is operative, refrigerant flow through said system is induced by heat charging the refrigerant at said heat recovery coil, liquid refrigerant recycling between said receiver and said heat recovery coil, the liquid refrigerant returning from the heat recovery coil to the receiver conveying heat charged refrigerant through and from the heat recovery coil to the receiver, heat charged vapor phase refrigerant communicates through said outflow conduiting from said receiver to said condenser, and heat depleted refrigerant communicates under gravity through said return conduiting from said condenser to said receiver, said return conduiting upstream of said receiver being shaped to define a liquid refrigerant trap comprising a vertically disposed bight portion of upright U-configuration that is free of refrigerant flow restrictions and connects said return conduiting to said receiver, said bight portion extending below said receiver lower side, said return conduiting adjacent said heat transfer coil being shaped to define a second liquid refrigerant trap comprising a vertically disposed bight portion of upright U-configuration that is free of refrigerant flow restrictions, said second trap bight portion having its refrigerant inflow leg connected to said condenser and its refrigerant outflow leg connected to a return conduiting high point vapor vent that is intermediate said traps, said second trap bight portion being disposed below said condenser, a bypass conduiting communicating between the upper side of said receiver and said condenser in parallel with said outflow conduiting, vapor vent conduiting communicating between said high point vapor vent and said bypass conduiting, three way valve means at the connection of said high point vapor vent and said bypass conduiting for alternately closing said bypass conduiting communication to said receiver and connecting said vent conduiting to said condenser through said bypass conduiting, or opening said bypass conduiting to full communication between said receiver and said condenser and closing the communication of said vapor vent conduiting to said bypass conduiting, and means for changing said valve between said positions for limiting the low point temperature of said heat recovery coil.

4. The apparatus set forth in claim 3 wherein:
said valve changing means is thermostatically controlled by thermostatic means at the locale of said heat recovery coil.

5. Apparatus for supplying heat to a fluid from a source of heat remote from the fluid, said apparatus comprising:

a closed circuit heat generated refrigerant convection flow type refrigeration system and comprising:

an evaporator adapted to be disposed in heat exchange relation with the heat source and comprising a heat recovery coil having refrigerant intake and discharge ends for receiving heat depleted refrigerant and discharging heat charged refrigerant therefrom when in said heat exchange relation with the heat source, a condenser disposed at a horizontal level that is above that of said heat recovery coil and adapted to be in heat transfer relation to the fluid, a liquid refrigerant receiver disposed at a horizontal level that is adjacent and above the horizontal level of said heat recovery coil and having top and bottom sides that are at the top and bottom of the receiver, outflow refrigerant flow conduiting communicating the top side of said receiver with said condenser for supplying heat charged refrigerant thereto, return refrigerant flow conduiting communicating said condenser with the bottom side of said receiver for flow thereto under gravity of liquid heat depleted refrigerant from said condenser to said receiver, supply refrigerant flow conduiting connecting the bottom side of said receiver with the intake end of said heat recovery coil for supplying liquid heat depleted refrigerant from said receiver to said heat recovery coil, recycle refrigerant flow conduiting connecting the discharge end of said heat recovery coil with the bottom side of said receiver for returning heat charged refrigerant from said heat recovery coil to said receiver, said system being charged with a refrigerant to provide a liquid refrigerant level within said receiver that is intermediate said sides of said receiver and above said bottom side of said receiver, with said condenser being sufficiently above said receiver for gravity return through said return conduiting of the liquid heat depleted refrigerant from said condenser to said receiver against fluid refrigerant pressure within said receiver, whereby, in the dormant state of said system said heat recovery coil is filled with liquid refrigerant and said system is thereafter vented and sealed, and when said heat recovery coil is in heat exchange relation to the heat source, and said condenser is in heat transfer relation to the fluid, refrigerant convection flow through said system is induced by heat charging of the refrigerant at said heat recovery coil, liquid refrigerant recycles between said receiver and said heat recovery coil through said receiver bottom side, said supply conduiting, and said recycle conduiting, with the liquid refrigerant returning from the heat recovery coil to the receiver conveying heat charged vapor phase refrigerant through and from the heat recovery coil to the receiver through its bottom side, heat charged vapor phase refrigerant rising through said liquid refrigerant level and passing through said outflow conduiting from said receiver top side to said condenser, and heat depleted liquid refrigerant returning under gravity through said return conduiting from said condenser to said receiver through said bottom side of said receiver.

6. The apparatus set forth in claim 5 wherein:
said refrigerant is of the halogenated hydrocarbon type.

7. The apparatus set forth in claim 5 wherein:
said return conduiting upstream of said receiver is shaped to define a liquid refrigerant trap comprising a vertically disposed bight portion of upright U-configuration that is free of refrigerant flow restrictions and connects said return conduiting to said receiver, said bight portion extending below said receiver lower side.

8. The apparatus set forth in claim 5 wherein:
said receiver comprises a vessel defining a refrigerant receiving chamber proportioned to have its horizontal dimensioning exceed its vertical dimensioning by a ratio that is on the order of four to one, with said refrigerant level being in said chamber.

9. The apparatus set forth in claim 8 wherein:
said vessel is of elongated cylindrical configuration and has its longitudinal axis horizontally disposed.

10. The method of supplying heat to a fluid at a predetermined site from a point remote from said site, said method comprising:

establishing a closed circuit heat generated refrigerant convection flow type refrigeration system including an evaporator, a condenser in heat transfer relation with the fluid at a level above that of the evaporator, a refrigerant receiver at a horizontal level that is adjacent and above the horizontal level of the evaporator and that is below the horizontal level of the condenser, outflow conduit means communicating between the receiver and the condenser for conducting heat charged vapor phase refrigerant from the receiver to the condenser, return conduit means for communicating under gravity heat depleted liquid phase refrigerant from the condenser to the receiver, and recycle conduit means connecting the receiver with the evaporator for recirculating refrigerant therebetween, charging said system with a halogenated hydrocarbon type refrigerant to establish the liquid level of the refrigerant within the receiver and sealing the system, establishing a source of heat in heat transfer relation relative to the evaporator, utilizing the heat transferred to the refrigerant at the evaporator from said heat source, forming the heat input to said system, as the motivating means to freely cycle by convection the refrigerant through the system free of mechanical pumping action on the refrigerant, while continuously convection flow circulating a liquid phase portion of the refrigerant between the receiver and the evaporator below the receiver liquid refrigerant leavel for effecting forced flow of the refrigerant through the evaporator and a carrying with such refrigerant flow of the vapor phase refrigerant to the liquid refrigerant in the receiver for rising through the liquid refrigerant in same to and through said reciver liquid level, and maintaining the refrigerant liquid level in the receiver at a level that is above the evaporator and below the condenser, and recycling the refrigerant through said system using said utilizing and convection flow circulation steps while maintaining said source of heat.

11. The method set forth in claim 11 wherein:

said recycling step is effected at a level of the system heat input relative to the heat output of said system, such that the recycling speed of the refrigerant through said system is at a speed level approximating the maximum recycling speed of the refrigerant employed in said system through said system for said heat input and output differential.

12. The method set forth in claim 10 wherein:

said recycling step is continuously effected while the source of heat is maintained.

13. The method set forth in claim 10 including:

sensing the temperature of the refrigerant circulating from the evaporator, and interrupting said recycling step when the temperature of the refrigerant circulating from the evaporator reaches a predetermined low level.

* * * * *